United States Patent

Mergy et al.

[11] Patent Number: 6,063,164
[45] Date of Patent: May 16, 2000

[54] FILTRATION PROCESS FOR GLASS FURNACE DUST

[75] Inventors: Jacques Mergy, Lillesand, Norway; Tanguy Massart, Courbevoie; Philippe Daudin, Chalon sur Saone, both of France

[73] Assignee: Saint Gobain Emballage, Courbevoie, France

[21] Appl. No.: 09/127,895

[22] Filed: Aug. 3, 1998

[30] Foreign Application Priority Data

Aug. 1, 1997 [FR] France ................................ 97 09911

[51] Int. Cl.⁷ .................................................. B01D 46/00
[52] U.S. Cl. ................................ 95/212; 55/467; 55/481; 95/281; 96/233; 96/400; 96/421
[58] Field of Search .......................... 95/212, 281, 22; 96/228, 231, 223, 399, 400, 401, 405, 407, 418, 421, 312, 313, FOR 103, FOR 104, FOR 132, FOR 170; 55/385.1, 486, 487, 481, 467

[56] References Cited

U.S. PATENT DOCUMENTS

| 1,816,836 | 8/1931 | Gagen | 96/231 |
| 3,250,059 | 5/1966 | Vosseller | 95/281 |
| 3,325,973 | 6/1967 | Illingworth | 95/281 |
| 3,563,474 | 2/1971 | Robinson | 96/233 |
| 3,686,832 | 8/1972 | Hori et al. | 96/228 |

*Primary Examiner*—Duane S. Smith
*Attorney, Agent, or Firm*—Oblon, Spivak, McClelland, Maier & Neustadt, P.C.

[57] ABSTRACT

A method for filtering the dust in gaseous emissions discharged from a glass furnace includes filtering the emissions at a traverse speed of at least 0.1 m/sec with at least one filtering element downstream of the furnace, and regenerating the filtering element by washing using a water-based solvent which is capable of dissolving and/or washing away most of the filtered dust.

35 Claims, 3 Drawing Sheets

FILTRATION PROCESS FOR GLASS FURNACE DUST

BACKGROUND OF THE INVENTION

1. Field of the Invention

The present invention relates to a method of filtering dust from the gaseous emissions, particularly chimney gases/smoke, that are released by industrial glass furnaces. More particularly, filtering dust from the gaseous emissions of draft glass furnaces which primarily use gas or fuel oil burners as their energy source.

2. Description of the Related Art

In the area of glass manufacturing, most furnaces are equipped with regenerators, i.e., regenerating air heaters that force the furnace to operate by inversion cycles. For example, end-fired furnaces which are widely used in the packaging glass industry and cross-firing burner furnaces which are also used in the packaging glass industry as well as in the window glass industry, as well as the furnaces used in the glass wool or rock wool or reinforcing textile fiber glass industries, are typically required with regenerators.

The operation of these glass furnaces results in the formation of abundant gaseous emissions. The emissions result not only from the combustion that generates the energy necessary for melting the vitrifiable raw materials, but also, more particularly, from flying vitrifiable materials in the melting chamber, in the furnace loading area and the entire area of molten glass materials covered by the glass composition, or from the exchanges that exist at the interface between the molten glass materials and the atmosphere that surmounts them. Such exchanges cause a certain number of chemical species of the molten glass materials to volatilize in the furnace atmosphere. These interactions are why the gaseous emissions discharged from the top of the smokestack can contain dust of various kinds and origins.

The growing preoccupations linked to the protection of the environment lead us to seek to minimize, to the greatest extent possible, any discharge considered to be polluting, such as $NO_x$, $CO_x$ or $SO_x$, as well as the various kinds of dusts generated in furnaces. This desire has been expressed by a commitment on behalf of the French packaging glass industry ("The Voluntary Global Commitment for the Environment by the French Packaging Glass Industry") endorsed by the Federation of Mechanical Glassworks of France in February 1997, which completed a departmental order signed on Oct. 21, 1996, amending the departmental order pertaining to the glass industry of May 14, 1993.

SUMMARY OF THE INVENTION

Thus, it is an object of the invention to reduce the percentage of dust discharged by draft glass furnaces under conditions of use that are compatible with current industrial installations.

Another object of the invention is to provide a filtration process for filtering the dust in gaseous emissions of a glass furnace, more particularly a draft furnace such as those using burners, particularly cross-firing burners, whether or not they operate by inversion.

According to the invention, these and other objects are achieved by filtering at least a portion of the dust from at least a portion of these emissions by using a filtering element installed downstream of the furnace, at a traverse speed of at least 0.1 m/sec and regenerating the filtering element through washing with at least one solvent, particularly a water-based solvent, suitable for dissolving and/or draining most of the dust filtered.

As used in the invention, "dust" means all chemical species likely to be found in liquid or solid phase under the temperature conditions at which filtration takes place.

As used in the invention, "traverse speed" means the speed at which the dust effectively traverses the filtering element, which therefore depends on various parameters, particularly the speed of the dust-laden emissions just upstream of the filtering element, as well as the size of the surface of the filtering element traversed by said emissions.

As used in the invention, "downstream of the furnace" means any location of the filtering element in an area through which gaseous emissions pass that is outside of the furnace strictly speaking (i.e., without including the regenerators, if such exist). Preferably, filtration takes place either at the exhaust pipes for the gaseous emissions between the lower part of the regenerators, if such exist, or the "upstream" extremity of the furnace, and the foot of the smokestack, or in the smokestack itself. For convenience's sake, in this latter case, filtration is preferably carried out at the foot of the smokestack. Alternatively, filtration can also be performed in the smokestack or at the upper extremity of the smokestack ("upstream" and "downstream" being determined in relation to the direction of discharge of the emissions).

Analyses have shown that, generally, the dust at the foot of the smokestack is essentially mineral—at least 50%. More particularly, at least 80% of such dust is in the form of salts such as sulfates like $PbSO_4$, $Na_2SO_4$, $K_2SO_4$, chlorides such as NaCl, KCl, silica such as $SiO_2$. Frequently there is a high prevalence of $Na_2SO_4$, particularly when one is manufacturing silico-sodo-calcic glass. Most dust is generally submicronic in size, i.e., approximately 0.01 to 1 μm.

The process in accordance with the invention is particularly advantageous in that it relies on filtration that can be called "rapid" without all the disadvantages that might be anticipated by a person skilled in the art. As used herein, "rapid" filtration means that the filtering element selected in accordance with the invention can filter a broad range of gaseous emissions that pass through it at varying speeds up to approximately 10 m/sec.

Gaseous emissions emitted by glass furnaces generally have a speed of approximately 1 to 10 m/sec., more specifically about 5 m/sec. in their discharge circuit. Filtration, in accordance with the invention, can therefore take place in the pipe or in a bypass of the emissions exhaust pipe in a manner that can accommodate "modulation" in terms of the traverse speed of the emissions through the filtering element. One can therefore maintain or only slightly change the speed of the emissions just upstream of the filtering element, so that the traverse speed is approximately the speed of the emissions just upstream. Such rapid filtration is advantageous since this results in only a minimum disturbance in the flow of gaseous emissions through the filtering element. For other technical reasons, one can also select a relatively different traverse speed (up to a factor of 10, preferably) from the speed of the emissions just upstream of the filtering element, particularly by "checking" these emissions by adjusting various parameters. Thus the traverse speed can be adjusted by modifying the speed of the emissions upstream of the filtering element (by changing the geometry, the dimensions of the upstream exhaust pipe, for example) and/or by modifying the traverse surface of the filtering element (particularly by increasing it).

Using rapid filtration speed was contrary to what was known of gas filtration techniques. In the past, it was accepted that the efficacy of a filter tends to diminish when the filtration speed increased. Thus, in the conventional gas filtration techniques, it was customary to choose much lower speeds, from approximately 0.01 to 0.05 m/sec for example. In order to lower the speed of the gases to be filtered, it was customary to use bag filters or folded filters.

Surprisingly, it has proven to be unnecessary to reduce the speed of filtration to this extent, since the process in accordance with the invention makes it possible to achieve an entirely acceptable level of filtration effectiveness under rapid filtration speeds. A possible explanation could be that in high-speed or rapid filtration, filtration is performed by "impacting" of the filtered particles on the filtering element and not, as is the case with lower speed filtration, by the progressive caking of the particles onto each other. When filtration is performed by caking, the first particles trapped in the filter acquire a filtering ability with respect to the particles "arriving" subsequently (formation of a "cake"). In contrast, when filtration is performed by "impacting" in accordance with the invention, the filtering elements tend not to form the usual "cakes". Rather, the filtering elements tend to clog suddenly. In practice, such a clog makes the filters more difficult to clean and recycle.

In order to overcome the difficulty of using an "impact"-type filter, the invention combines rapid filtration with the regeneration of the filtering elements by washing with a water-based solvent. The invention thusly exploits the high water solubility of a large percentage of the dust that it seeks to filter, especially those that are found in the form of salts, and which are generally prevalent in quantity when one considers all the dust in suspension in the emissions, such as sodium sulfate $Na_2SO_4$, but also NaCl and KCl. Once filtered, all of these particles dissolve easily in water. Furthermore, due to the mechanical effect of draining, a large percentage of the other particles that do not, or are less likely to dissolve in water, like silica particles for example, are also freed from and washed out of the used filtering element. Thus most of the filtered particles are eliminated without any problem, which makes it possible to reuse the filtering element a great number of times—an essential condition for the economic feasibility of the filtration targeted by the invention.

Preferably, an adequate number of filtering elements are used so that the filtration/regeneration cycles result in no or little dead time between two filtrations performed by two successive filtering elements.

Advantageously, in accordance with the invention, gaseous emissions are filtered at a temperature of at least 150° C., more particularly at least 180° C., and preferably no higher than 400 to 500° C. The temperature is preferably approximately 200° C. In this range of temperatures, most of the dust desired to be filtered is already in a liquid or solid form, which will allow it to be filtered. Furthermore, since these temperatures are typical for emissions downstream of the furnace, the invention allows them to be filtered without having to modify their temperature, more particularly without having to cool them, which is industrially advantageous since this avoids complicating the installation. Alternatively, the gaseous emissions in the zone where filtration takes place, may be cooled as desired.

These temperatures are sufficiently high, however, so as to limit the percentage of dust in a liquid state, which tends, for at least some of them such as $H_2SO_4$, to clog the filtering element. Preferably the filtration temperatures do not exceed 400 to 500° C. Thus there is a rather wide range of choices with respect to the materials used to produce the filtering elements and all the devices and equipment used to install them.

In accordance with a preferred mode of embodiment, during filtration, the filtering element is positioned roughly across the pipe conducting the emissions from the furnace outlet, particularly from the regenerator flues to the smokestack. The surface of the filtering element transverse to the emissions flow is therefore preferably roughly equal to or greater than the cross-section of the pipe. Preferably, all or most of the emissions pass through the filtering element once it is put into place. As indicated earlier, changing the size of the traverse surface of the filtering element makes it possible to adjust or modulate the speed of the emissions during their filtration, if necessary.

Different characteristics specific to the filtering elements allow the evaluation of their performance/behavior and, more particularly the load loss. The load loss for any liquid or gas can either be measured experimentally or calculated by using various parameters in a customary fashion, including $\Delta p$ the load loss in Pa, Q the rate of flow in $m^3$/sec., $\mu$ the viscosity in Pa.s, A the surface of the filtering material exposed to the rate of flow in $m^2$, H the thickness of the filtering material in m, and finally k, the permeability factor in $m^2$.

In accordance with the invention, one preferably selects filtering elements that have a load loss (initial) thus calculated of no more than 10000 Pa (100 mbar), more specifically no more than 4000 Pa (40 mbar), preferably no more than 2000 Pa (20 mbar), more particularly between 100 and 1000 Pa (between 1 and 10 mbar).

Another characteristic of filtering elements is the absolute filtration threshold, which is measured using the bubble point value, which is equal to the pressure required to cause a first dynamic bubble to pass through a submerged filter (standard ISO 4003). The formula (only valid for filters made of metal fibers) indicates the absolute filtration threshold is 37000 divided by the bubble point in Pa. This threshold gives an indication of the size of the pores of the filter material. Preferably, the threshold for the filtering element used is at least 20 $\mu$m, and more specifically between 40 and 80 $\mu$m. This range corresponds to a large size, which contributes at least in part to the rapidity of filtration. This is particularly contrary to the teachings of the prior art since, as underscored previously, most of the dust to be filtered is generally submicronic in size.

Preferably, the base material of the filtering element can tolerate temperatures of approximately 150° C. to 400° C. and relatively corrosive atmospheres. More specifically, the base is preferably a metallic or ceramic material that can be obtained by particle or fiber sintering or by constructions of textile or felt fibers. For example, 316L stainless steel or an Inconel like Inconel 601 or any metal alloy that resists oxidation at high temperatures can be used.

From the moment filtration is performed, an undesirable load loss is created downstream of the filtering element. In accordance with a further aspect of the invention, it is therefore preferable to offset the load loss created by the filtering element, at least in part, by placing an ad hoc device, such as a fan, "downstream" of the filtering element. (The terms "downstream" and "upstream" refer to the location of the device with respect to the position of the filtering element according to the direction of travel of the gaseous emissions to be filtered). This device may include a modulator for modulating this compensation. For example, a fan may optionally have an adjustable rotation speed and/or include blades with an adjustable angle of inclination.

In operation, the filtering element is used cyclically, each cycle being separated from the next one by at least one regeneration step. Although the initial load loss of the new filtering element is precisely known, this load loss can change slightly after a large number of regenerations. Furthermore, during the filtration cycle the load loss tends to increase. All these variations can be measured precisely using adapted sensors, so that the device(s) designed to offset the filtering element load loss can then be controlled automatically, semi-automatically or manually.

For increased simplicity, one can choose to keep the "downstream" fan device operating at a constant speed and instead modulate at least one adjustable flap-type device placed "upstream". The "downstream" device(s) may be configured to handle the largest percentage of the load loss compensation, while the "upstream" device(s) regulate loss by offsetting, at least in part, the variations in load loss over time induced by the filtering element.

It has been found that the filtering element should be regenerated periodically. The frequency can be set according to a parameter measured continuously or intermittently during the filtration cycle. In particular, this can involve an increase threshold for the variations in load loss created by the filtering element.

Another option is to optimize the filtering element so that the frequency coincides with that of the furnace inversion cycles, generally about every 20 minutes. Thus, one can "take advantage" of the moment when the furnace inversion cycle changes, a moment that is already a source of disruption of the operation of the furnace, to change the filtering elements.

In accordance with a preferred variation of the invention, when there is a significant presence of lead sulfates $PbSO_4$, after having successively completed the dust filtration step once, and after the filtering elements regeneration step has been repeated a predetermined number of times by washing with a water-based solvent, an additional regeneration step for the filtering elements is carried out by washing with a sodium carbonate (NaOH)-based solvent.

The sodium carbonate makes it possible to regenerate the filtering element very effectively when it is clogged with lead sulfate $PbSO_4$ particles. The number of water regenerations will, for example, be chosen according to a predetermined threshold for the weight of the filtering element, directly proportional to the load loss induced by this filtering element.

Other parameters can be used in accordance with this step to determine the nature and the concentration of the sodium carbonate used.

Therefore, advantageously, the percentage of $PbSO_4$ detected in the dust, typically about 5% maximum, can be taken into consideration.

Also advantageously, it is preferable to separate the filtered $PbSO_4$ particles from the sodium carbonate NaOH, so as to reintroduce into the composition of vitrifiable raw materials all or part of the quantity of sodium carbonate used. This further lowers the cost of filtration in accordance with the invention indirectly by lowering the cost of the raw materials.

Preferably, the concentration of the sodium carbonate should not exceed 1 mole/liter, which facilitates the separation cited above.

Obviously other solvents capable of dissolving the $PbSO_4$ particles can be used in connection with the invention. Thus, ammonium acetate ($H_3COONH_4$) and sodium acetate ($H_3COONa$) have proven to be particularly effective.

In accordance with a further aspect of the invention, a revolving strip filter configuration can be used wherein the filtration area is moved progressively during the filtration cycle is to make room for a "new" or regenerated filtration area. Thus it is possible to keep the load loss created by the filtering element at a constant level.

It may be necessary to move or remove the filtering element to regenerate it. It can then be replaced by another new or regenerated filtering element concomitant with, before or after the removal of the filter to be regenerated.

It may be desired to regenerate the filtering element "in situ" without having to remove it from its filtration position. In this case, one can advantageously provide for at least two fixed "parallel" filters, each in a branch of the exhaust pipe for the gaseous emissions, for example, one filtering while the other is being regenerated, using flap-type mechanisms to guide the emissions alternately into either of the branches.

Regeneration of the filtering element is performed preferably by at least one soaking in a water-based solvent bath, or a static or mobile spraying, or by irrigation with said solvent. Optionally, regeneration can be completed by drying with compressed air.

If desired, all or part of the dust-laden water-based solvent obtained after regenerating the filtering elements can be recycled, particularly by reintroducing it into the furnace, for use in wetting the vitrifiable materials in the furnace loading area. In effect, it is customary to add water to the raw materials prior to loading them into the furnace. Using the regeneration water for this purpose is all the more advantageous since it brings with it $Na_2SO_4$ materials or silica that can be used as raw materials themselves. A dual industrial advantage is thereby achieved—avoiding the generation of water that needs to be treated and reducing the need and therefore the cost of raw materials.

In order to optimize this recycling to the utmost, it is preferable to provide for quantitative analysis of the water to be recycled in order to be able to dilute it, if necessary, based on the total quantity of water required to wet the raw materials, and to know precisely the quantities of materials reintroduced into the furnace. Of course, the regeneration water can also be used for other purposes.

The invention also targets the use of the filtration process described previously so that the glass furnace discharges no more than 150 mg of dust per $Nm^3$ of smoke standardized to 8% oxygen, more specifically no more than 50 mg/$Nm^2$ standardized to 8% oxygen, and/or no more than 0.35 kg of dust per ton of melted glass, more specifically no more than 0.2 kg. These thresholds are, more specifically, those recommended in the commitments and departmental orders cited at the beginning of this text.

The invention also targets the glass furnace filtering device suitable for implementing the filtration process in accordance with the invention. Thus, the filtering device is advantageously equipped at the exhaust pipe or at least one of the exhaust pipes for gaseous emissions between the furnace outlet, particularly the outlet for the regenerators, and the smokestack, or at the foot of the smokestack, with a filtering element configured to filter the dust at greater than 1 m/sec., and whose features in terms of load loss and absolute filtration threshold are preferably those cited earlier. It is thereby possible to achieve a filtration effectiveness of at least 20%, more particularly at least 50 to 95%, where effectiveness is defined as the ratio (expressed as a percentage in weights) between the percentage of dust retained by the filtering element and the percentage of dust contained in the emissions.

In the installation, the filtering element is generally installed or mounted on a device such as a moveable filter holder that is capable, during the filtration cycle, of positioning it roughly across the section of the feed pipe for the gaseous emissions, and capable of extracting it periodically in order to regenerate and replace it. As mentioned above, the filtering elements can also be mounted permanently, thereby causing at least two elements to work "in parallel fashion."

As cited earlier, the installation can also be equipped with at least one mechanism for offsetting the load loss in the pipe downstream of the filtering element and potentially at least one upstream compensation mechanism, more particularly for the variation in load loss as a function of time caused by said element. At least one of these mechanisms can be controlled automatically or semi-automatically by computer/electronic means based on a control loop using pressure sensors.

The installation is also preferably equipped with regeneration mechanisms, particularly near the pipe where filtration takes place. These mechanisms can include bath-type means for washing the filtering elements with water, mobile or stationary spraying mechanisms, irrigation mechanisms, potentially combined with mechanisms for collecting the wash water such as storage tanks. The regeneration mechanisms can additionally include mechanisms for washing with sodium carbonate. Mechanisms for recycling this wash water can also be provided in order to reintroduce it into the furnace, particularly in the furnace loading area. These can include mechanisms for analyzing this water, possible mechanisms for diluting it and mechanisms for supplying it to the furnace.

BRIEF DESCRIPTION OF THE DRAWINGS

The invention will be described in more detail hereinafter using a non-restrictive mode of embodiment illustrated by the following figures, wherein.

DESCRIPTION OF THE PREFERRED EMBODIMENTS

Figure 1:
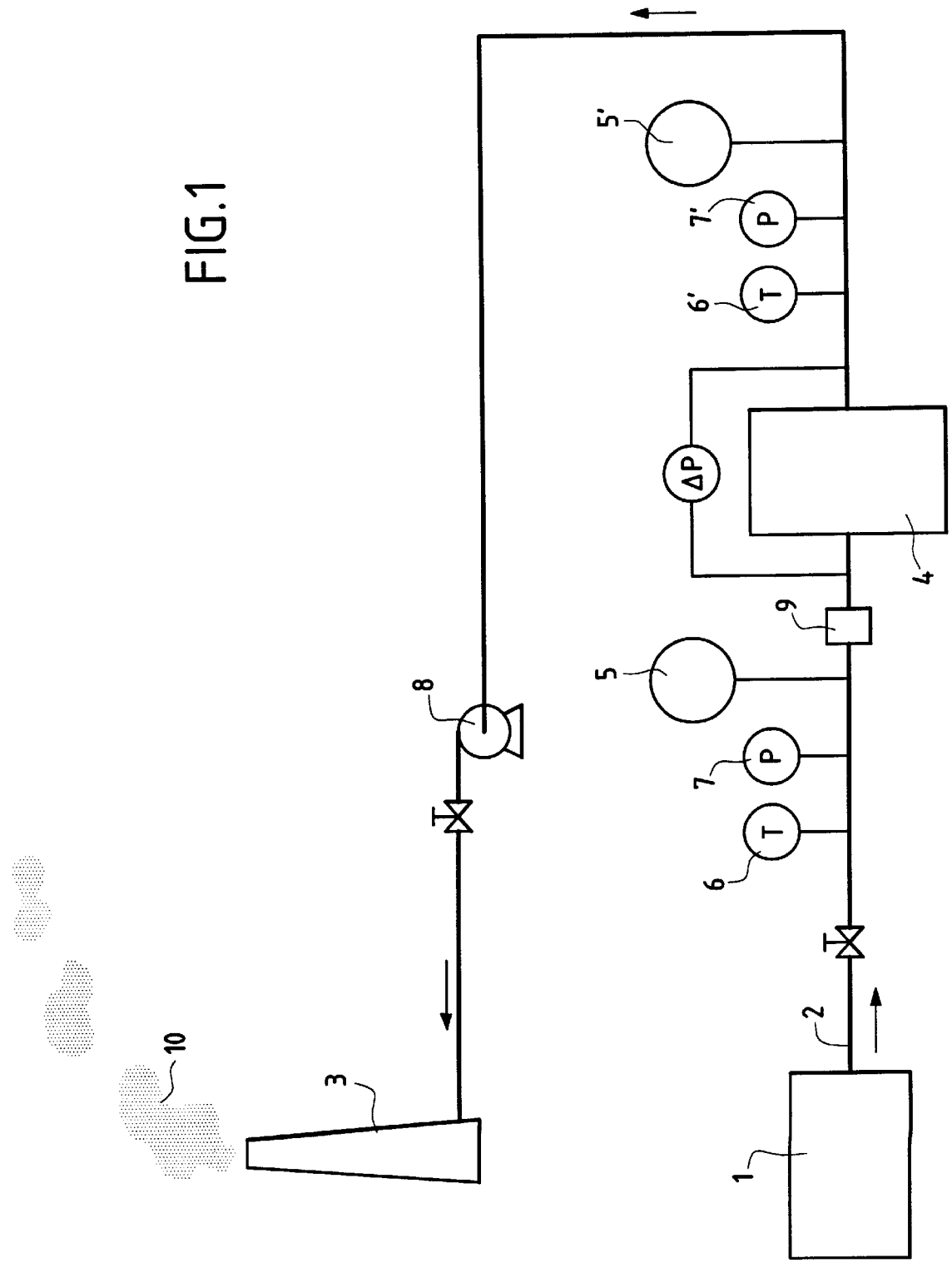
FIG. 1 is a diagram of a glass furnace installation using the filtration process in accordance with the invention.

FIG. 1 shows a glass furnace installation in its entirety. This is and end-fired glass furnace that operates by inversion, commonly used in the packaging glass industry. Any other glass furnace, particularly for manufacturing window glass and/or not operating by inversion, can use the invention under similar conditions.

Here, what is involved is the manufacture of standard silico-sodo-calcic melted glass using a furnace (1) that, through multiple channels (not shown), feeds equipment for shaping hollow glassware (also not shown, but well known to a person skilled in the art).

Below the regulators, also called flues (not shown), constructed in a known manner of fire brick checkerwork, large quantities of gaseous emissions are emitted and guided by one or more pipes (2) toward the smokestack(s) (3) which are designed to discharge them into the surrounding atmosphere. The rate of flow of the emissions in this pipe can, for example, be at least 1000 $Nm^3$ per hour, and particularly for industrial installations, on the order of 10000 to 30000 $Nm^3$ per hour. The speed of emissions is at least 1 m/sec. In the furnace shown, it is approximately 3 to 5 m/sec.

When they leave the regenerators, the emissions have already been well exhausted from a thermic standpoint. Nevertheless their temperature is still around 400 to 500° C. leaving the regenerator, while at the foot of the smokestack their temperature has dropped to approximately 200 to 250° C.

In the invention, the pipe (2) contains a filtration system that includes a filter (4), an upstream dust analyzer (5) and a downstream dust analyzer (5') ("upstream" and "downstream" refer to the direction of discharge of the emissions shown by the arrows), upstream and downstream temperature sensors (6 and 6'), and upstream and downstream pressure sensors (7 and 7'). The system also comprises a downstream fan (8) and an adjustable upstream flap (9). The filter is located in an area where the temperature of the emissions is between 200 and 400° C., approximately 300° C.

By way of example, we can consider that a standard dust composition primarily comprises a high percentage of $Na_2SO_4$ (solubility in grams for 100 grams of water at 20° C.: approximately 19.3), but also $SIO_2$ (insoluble in water), NaCl (solubility of 26.37 with the same conventions), $K_2SO_4$ (solubility of 10 with the same conventions) and potentially KCl (solubility of 25.4 with the same conventions).

Preferably, filter element (4) is selected so that it has the lowest load loss possible, so that this load loss can be offset easily without significant increases in terms of equipment expenditures for the downstream fan (8) and in terms of the energy expense connected with their use. Therefore, the filter is chosen so that it has a maximum initial load loss of 1000 Pa (10 mbar), which can be offset by a single fan. (It goes without saying that while remaining within the framework of the invention, one can also use filters with a higher load loss if an advantage other than an economic advantage is associated with this choice). The absolute filtration threshold of filter element (4) is preferably at least 20 $\mu$m, approximately 60 $\mu$m, for example. It is placed at a right angle to the axis of travel of the emissions in the pipe (2) that has a cross section of approximately 1 to 4 $m^2$, without pleating. If desired, the load loss created by the filter can be reduced and/or the filter traverse speed of the gaseous emissions by three different means, increasing the traverse surface by folding the filter, reducing the filtration time or finding a more high-performance filter. In one working example, a filter element from the Bekipor line marketed by the Bekaert company, more specifically the sintered metal Bekipor ST filter with a stainless steel fiber base was used. It is important that the filter element used be able to withstand high temperatures, and that the filtration threshold can be selected from a range from 1 to 100 $\mu$m.

In operation, the filtration process is begun when a new or regenerated filter element is placed in filtration position at a given moment, preferably coinciding with the inversion period in the furnace (1). The initial load loss $\Delta\rho$ and subsequent load loss of the filter throughout the filtration cycle, which is, for example, identical (10 to 20 minutes) to that of the furnace, are measured using the pressure sensors (7,7'). The initial load loss is then offset, for example 10 mbar, using the fan (8) whose speed is not changed during the filtration cycle. According to the variation in load loss $\Delta\rho$ measured, the position or the inclination of the flap (9) is adjusted continuously or at regular time intervals to compensate for these variations to the greatest extent possible.

Preferably, flap (9) is controlled using a regulation system controlled by the upstream and downstream pressure measured by the sensors (7,7').

The comparison of the measurements taken by the analyzers (5,5') allows measurement and adjustment according to the effectiveness of the filtration by modulating some of the filtration parameters. In the above working example, the effectiveness was at least 30%, and, if necessary, it could be optimized to very high values approaching 90 to 95%. It is, of course, possible to modulate it according to the quantity of dust measured upstream, the emissions being capable of having a dust concentration that varies over time Alternatively, only a portion of the gaseous emissions discharged by the furnace can be filtered.

Figure 2:
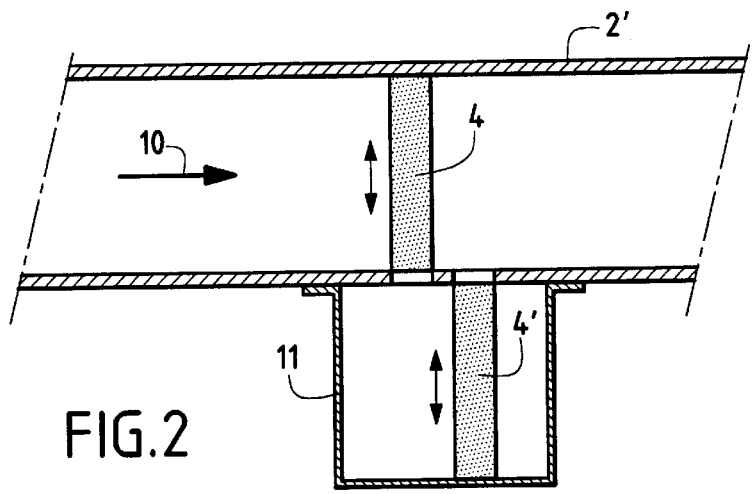
FIG. 2 is an enlarged view of the diagram in FIG. 1 in the area where the filter is located.

At the end of the filtration cycle the nearly clogged-up filter is replaced by a regenerated filter, which is shown more explicitly in FIG. 2. As shown in the figure, a filter holder system (11) mounted onto the pipe (2') positions a filter (4) across the cross section of the pipe (2'). Once its filtration cycle is completed, the filter holder is capable of replacing it with a regenerated filter (4') that is placed in standby position during the filtration cycle of the filter (4). The two filters thus function in alternating fashion, one being regenerated while the other is filtering.

One alternative consists in causing a continuous feed filter (4") to pass across the cross section of the pipe in order to have a consistent load loss.

Figure 3:
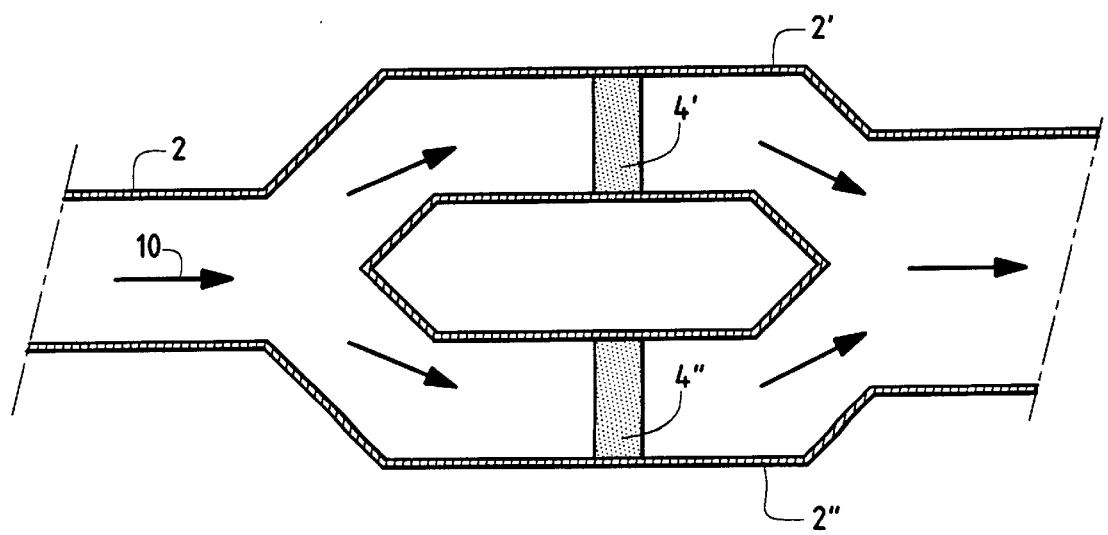
FIG. 3 is an enlarged view of the diagram in FIG. 1 in the area where the filter is located, in a different configuration than in that of FIG. 2.

Another alternative is shown in FIG. 3. As shown in the figure, the pipe (2) in the filtration area separates into two identical branches (2' and 2"), each respectively equipped with a filter (4' and 4") identical to the filter (4) in FIG. 2. The gaseous emissions in the pipe (2) pass in alternating fashion into one or the other of the two branches (2' and 2") by means of valve systems (not shown) that are automatically controlled at the same frequency as that of the filter replacement performed in FIG. 2. When the emissions pass into the pipe (2'), filter (4') plays its filtering role while filter (4") of pipe (2") is regenerated "in situ" by solvent immersion or spraying. When the emissions pass into pipe (2"), inversely filter (4") plays its filtering role while filter (4') is regenerated.

Figure 4:
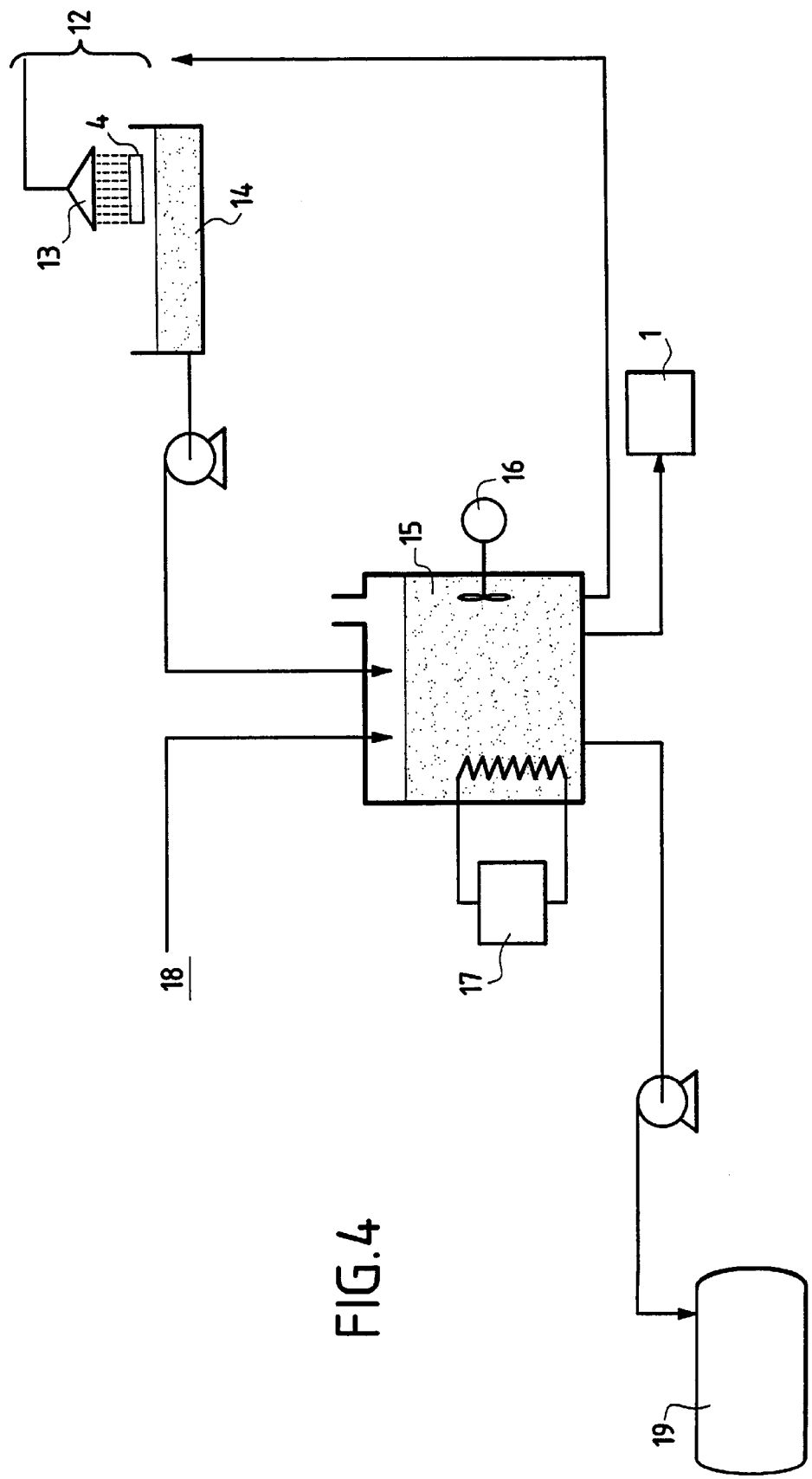
FIG. 4 is a diagram of the technique for regenerating the filters and recycling the wash water in accordance with the invention.

FIG. 4 illustrates the regeneration of the filter (4) installed in accordance with FIG. 2. The filter (4) is withdrawn to a washing system (12) comprising a water spraying system (13) and a collection tank (14). The wash water is then stored in a retention tank (15) whose homogeneity and temperature are checked and monitored, preferably at the same time, using mechanical agitators (16) and cooling mechanisms (17) and/or heaters. Optionally, the pH is also checked and controlled using mechanisms for measuring and adjusting the pH that are not shown. In fact, the dissolution of the dust is accomplished even better when the heat of the filters heats the wash water, which can be chosen at ambient temperature or already heated to 30 or 40° C. if necessary (the solubility of the salts in the water increases appreciably with the temperature). After quantitative analysis of the dust in the water, it can be diluted with tap water (18) supplied by the appropriate conduits. Then from this water that has been adjusted in composition, in temperature and potentially in pH, a portion is drawn off in order to inject it into the moistening apparatus for the vitrifiable raw materials at the head of the furnace (1). All or part of this water can also be discharged to a storage tank (19) and/or recycle a portion of this wash water in the washing system (12).

Additionally, it may be advantageous to provide for mechanisms for liquid phase filtration of particles with large granulometry (not shown) particularly at the outlet of the retention tank (15), so as to prevent the various conduits from becoming blocked if solid particles of significant size ever end up being discharged into the tank (15). The regenerated filter (4) is itself dried with compressed air, then returned to standby position in the filter holder system (11).

In conclusion, the invention has developed a very interesting filtration system that can be defined primarily by:
 a filter that is effective at high speed,
 filter regeneration that exploits the solubility and/or the drainage capability of the dust filtered in water.
 a dust control system that mitigates the load loss (variable) created by the filter,
 potential recycling of the wash water with reintroduction into the furnace.

The industrial advantages include little disturbance for installing this process on existing lines, great flexibility of implementation, reasonable cost and objectives established in the various existing standards are achieved.

What is claimed as new and desired to be secured by Letters Patent of the United States is:

1. A method for filtering dust from gaseous emissions coming from a glass furnace, comprising the steps of:
 filtering at least a portion of dust contained in at least a portion of emissions from a glass furnace at a traverse speed of at least 0.1 m/sec using a filtering element installed downstream of the furnace;
 regenerating the filtering element by washing using at least one water-based solvent, capable of dissolving and washing away at least a portion of the dust filtered.

2. A method according to claim 1, wherein in the emissions are filtered at a temperature between 150° C. and 500° C.

3. A method according to claim 1, wherein the filtering element is positioned within at least one of a pipe conducting the emissions from the furnace, a pipe conducting emissions from regenerator flues and a smokestack, wherein the filtering element has a traverse surface for gas/smoke roughly at least as large as the surface area of the cross section of said at least one of a pipe and a smokestack.

4. A method according to claim 1, wherein said filtering element has a maximum initial load loss of 10,000 Pa.

5. A method according to claim 1 wherein said filtering element that has an absolute filtration threshold of at least 20 μm.

6. A method according to claim 1, wherein the filtering element has a base of metal or ceramic, constructed of sintered particles, sintered fibers, textile fibers or felt fibers.

7. A method according to claim 1, further comprising the step of offsetting at least a portion a load loss created by the filtering element using at least one device installed downstream of the filtering element.

8. A method according to claim 7 wherein said step of offsetting further comprises adjusting an upstream flap mechanism to offset, at least in part, the variations in load loss over time induced by the filtering element.

9. A method according to claim 1 wherein the step of regenerating further comprises regenerating the filtering element periodically according to at least one of a frequency coinciding with that of the furnace inversion cycles and a set increase threshold value for the load loss created by the filtering element.

10. A method according to claim 1 further comprising the step of regenerating the filtering element by washing with a sodium carbonate NaOH-based solvent, after the step of regenerating the filter element by washing with a water-based solvent has been repeated a predetermined number of times.

11. A method according to claim 1 further comprising the step of maintaining the load loss created by the filtering element by using a revolving strip.

12. A method according to claim 1 further comprising the step of removing a used filtering element from the furnace in order to regenerate the used filter and replacing the used filtering element with at least one of a new and a regenerated filtering element.

13. A method according to claim 1 wherein said step of regenerating further comprises regenerating the filtering element while it is installed in the furnace without removing it from its filtration position, by providing for the use of at least two filtering elements.

14. A method according to claim 1 wherein the step of regenerating further comprises at least one of soaking in a solvent bath, stationary or mobile spraying, and irrigation.

15. A method according to claim 1, further comprising the step of recycling at least part of dust-laden solvent generated during said step of regenerating the filtering element by wetting the vitrifiable materials with the dust-laden solvent prior to loading them into the furnace.

16. A method according to claim 1, wherein said step of filtering further comprises adjusting an amount of filtration so that no more than 150 mg of dust per $Nm^3$ of smoke standardized to 8% $O_2$, no more than 50 mg/$Nm^3$ at 8% $O_2$ and no more than 0.35 kg of dust per ton of melted glass is discharged from the furnace.

17. A glass furnace filtering device comprising:
  a first filtering element provided at an exhaust pipe through which gaseous emissions from a glass furnace are guided, said first filtering element provided downstream of the furnace, said first filtering element configured to filter dust in the gaseous emissions at greater than 0.1 m/sec.

18. A glass furnace filtering device according to claim 17, wherein said first filtering element has a load loss of no more than 10,000 Pa, an absolute filtration threshold of at least 20 μm and an effectiveness level of at least 30%.

19. A glass furnace filtering device according to claim 17, further comprising:
  a moveable filter holder device configured to position said first filtering element, during filtration, substantially across the section of a pipe or of a smokestack of a glass furnace through which the gaseous emissions are fed, said moveable holder also configured to periodically extract said first filtering element in order to regenerate or replace it.

20. A glass furnace filtering device according to claim 17, further comprising:
  a second filtering element mounted in parallel with said first filtering element in said exhaust pipe;
  wherein said furnace filter is configured to operate said first and second filtering elements in alternating fashion.

21. A glass furnace filtering device according to claim 17, further comprising:
  at least one offsetting mechanism for offsetting a load loss in the exhaust pipe, downstream from said furnace, generated by said first filtering element, said offsetting mechanism including a fan.

22. A glass furnace filtering device according to claim 17, further comprising:
  a regeneration mechanism configured to wash said filtering element with water, said regeneration mechanism comprising at least of baths, mobile or stationary spray distributors, and irrigation mechanisms; and
  a wash water collection mechanism configured to collect the water used by said regeneration mechanism and to reintroduce the water into a wetting area for wetting vitrifiable materials prior to placing them in the furnace.

23. A glass furnace filtering device according to claim 22, wherein said regeneration mechanism further comprises means for washing with sodium carbonate.

24. A glass furnace filtering device according to claim 22, wherein said wash water collection mechanism comprises:
  at least one retention tank equipped with at least one composition homogenizing mechanisms; and
  at least one homogenization and temperature control mechanism.

25. A method according to claim 1 wherein the traverse speed is between 1 to 10 m/sec.

26. A method according to claim 1, wherein said filtering element has a maximum initial load loss of 4,000 Pa.

27. A method according to claim 1, wherein said filtering element has a maximum initial load loss between 100 and 1000 Pa.

28. A method according to claim 1 wherein said filtering element that has an absolute filtration threshold between 40 and 80 μm.

29. A method according to claim 7, wherein the offsetting device is a fan.

30. A method according to claim 29 wherein the fan includes at least one of an adjustable rotation speed and an adjustable angle of inclination of the blades.

31. A method according to claim 14 wherein the step of regenerating further comprises drying with compressed air.

32. A glass furnace filter according to claim 18, wherein said filtering element has an effectiveness level between 50 and 95%.

33. A glass furnace filtering device according to claim 21, further comprising:
  an upstream pressure sensor provided on an upstream side of said first filtering element;
  a downstream pressure sensor provided on a downstream side of said first filtering element;
  at least one variable offset mechanism for offsetting the variation in load loss over time due to the filtering element, said variable offset mechanism including a flap controlled according to a pressure drop across said as detected by said upstream and downstream pressure sensors.

34. A glass furnace filter according to claim 24, wherein said wash water mechanism further comprises at least one of pH controlling mechanism configured to control the pH of the water and means for filtering solid particles at the outlet of said retention tank.

35. A method according to claim 1, wherein the traverse speed is within the range of at least 1 to 10 m/sec.

* * * * *